United States Patent
Knechten

(10) Patent No.: US 11,032,657 B2
(45) Date of Patent: Jun. 8, 2021

(54) VOLUME ACCELERATION SENSOR CALIBRATION

(71) Applicant: Siemens Industry Software NV, Leuven (BE)

(72) Inventor: Tom Knechten, Rosmeer (NL)

(73) Assignee: SIEMENS INDUSTRY SOFTWARE NV, Leuven (BE)

( * ) Notice: Subject to any disclaimer, the term of this patent is extended or adjusted under 35 U.S.C. 154(b) by 0 days.

(21) Appl. No.: 16/685,236

(22) Filed: Nov. 15, 2019

(65) Prior Publication Data
US 2020/0162829 A1    May 21, 2020

(30) Foreign Application Priority Data
Nov. 16, 2018   (EP) ..................... 18206730

(51) Int. Cl.
| | | |
|---|---|---|
| *H04R 29/00* | (2006.01) | |
| *H04R 3/04* | (2006.01) | |
| *H04R 9/06* | (2006.01) | |

(52) U.S. Cl.
CPC ............. *H04R 29/003* (2013.01); *H04R 3/04* (2013.01); *H04R 29/001* (2013.01); *H04R 9/06* (2013.01)

(58) Field of Classification Search
CPC .... H04R 29/00; H04R 29/001; H04R 29/002; H04R 29/003; H04R 3/04; H04R 3/06; H04R 3/08; H04R 3/007; H04R 9/06
(Continued)

(56) References Cited

U.S. PATENT DOCUMENTS

| | | | | |
|---|---|---|---|---|
| 5,815,585 A | * | 9/1998 | Klippel | .............. H03H 21/0001 381/59 |
| 10,034,109 B2 | * | 7/2018 | Russell | ................ H04R 29/003 |

(Continued)

FOREIGN PATENT DOCUMENTS

| | | |
|---|---|---|
| EP | 2063275 | 5/2009 |
| WO | WO2009/143838 | 12/2009 |

OTHER PUBLICATIONS

Von Martens H-J et al: "Traceability of vibration and shock measurements by laser interferometry", Measurement, Institute of Measurement and Control. London, GB, vol. 28, No. 1, pp. 3-20, XP004205300, ISSN: 0263-2241, DOI: 10.1016/S0263-2241(00)00003-8; 2000.

*Primary Examiner* — Xu Mei
(74) *Attorney, Agent, or Firm* — Cozen O'Connor

(57) ABSTRACT

A method and system for calibrating an integrated volume acceleration sensor of a loudspeaker, wherein the method includes driving the loudspeaker with a calibration signal and meanwhile generating a sensor output signal by the integrated volume acceleration sensor measuring a volume acceleration over time of a motion element fixed to a moving part of the loudspeaker and/or of the moving part while the loudspeaker is driven with the calibration signal as well as generating a reference output signal by a reference sensor measuring the volume acceleration over time of the motion element and/or of the moving part of the loudspeaker while the loudspeaker is driven with the calibration signal, and additionally includes calculating a calibration value for the integrated volume acceleration sensor based on a ratio of the sensor output signal and the reference output signal and based on a predetermined reference calibration value of the reference sensor.

16 Claims, 1 Drawing Sheet

(58) Field of Classification Search
USPC .............................. 381/59, 96, 111, 116, 117
See application file for complete search history.

(56) References Cited

U.S. PATENT DOCUMENTS

| | | | |
|---|---|---|---|
| 10,142,754 B2 * | 11/2018 | Sheen ................... | H04R 29/003 |
| 10,516,957 B2 * | 12/2019 | Russell .................. | H04R 9/025 |
| 2005/0031134 A1 * | 2/2005 | Leske ................... | H04R 29/003 |
| | | | 381/59 |
| 2009/0060213 A1 * | 3/2009 | Bachmann ............. | H04R 3/002 |
| | | | 381/59 |
| 2015/0086027 A1 | 3/2015 | Moser et al. | |

* cited by examiner

VOLUME ACCELERATION SENSOR CALIBRATION

BACKGROUND OF THE INVENTION

1. Field of the Invention

The present invention relates to a method and a system for calibrating an integrated volume acceleration sensor of a loudspeaker, where the integrated volume acceleration sensor is particularly calibrated via a reference sensor measuring the volume acceleration over time of a motion element fixed to a moving part of the loudspeaker.

2. Description of the Related Art

A loudspeaker with an integrated volume acceleration sensor can be a so-called volume acceleration source. $\dot{Q}$ is often used to label a variable representing the physical value of volume acceleration. A volume acceleration source is a device that can be used to take measurements related to acoustic properties like (vibro-)acoustic paths of a test object or structure (e.g., a vehicle with a combustion engine).

Traditionally, when performing a measurement campaign to quantify the acoustic paths of the test structure, one might employ an impact hammer or an electrodynamic shaker (which measures force) and measure the acoustic response (sound pressure) with a microphone. This would result in a Frequency Response Function (FRF) between an input location (here the mounting point of a combustion engine) and a receiver location (e.g., an ear of a driver of the vehicle). To quantify the sound contribution for the test structure (vehicle that has a motor attached to it), for example, at four separate locations, this could require twelve separate impact measurements comprising applying a force via the impact hammer at each of the four separate locations in three different directions. This would result in twelve separate Pressure/Force (P/F) transfer functions.

Using the volume acceleration source, it is possible to perform these twelve measurements all at the same time using the reciprocity principle. Putting the volume acceleration source at an acoustic response location of interest and accelerometers (sensors measuring the acceleration of an object) on attachment locations (locations of interest), the measurement is performed at one time. Thereto, a test sound signal is provided to the volume acceleration source (e.g., from a controller of a testing unit). The volume acceleration source will produce a test sound field based on the test sound signal. The accelerometers measure the acceleration of the attachment locations using Maxwell's reciprocity principle respective FRFs can be derived. In order to derive exact FRFs, it is necessary to precisely know the acoustic input load applied to the test structure at the input location. The precise measurement of the acoustic input load provided to the test structure is measured by the integrated volume acceleration sensor, which has to be calibrated. Only if the integrated volume acceleration sensor is calibrated the acoustic input load or rather the acceleration of a membrane of the volume acceleration source/loudspeaker can be derived from an output signal (voltage) of the integrated volume acceleration sensor. Such volume acceleration source or rather loudspeaker with calibrated integrated volume acceleration sensor can be used, for example, in automotive technologies, where the propagation of sound emitted from a combustion engine and/or a chassis has to be analysed in order to increase comfort (quietness) in a vehicle.

It is known to calibrate volume velocity sensors based on sound pressure measurements with microphones that require a special acoustic environment for performing the calibration. The volume velocity describes the velocity of a moving surface that moves a medium (e.g., air) thus producing sound waves that have a respective sound pressure. It is further known to improve the performance of a loudspeaker by measuring the volume acceleration of a membrane of the loud speaker. Yet, there is no simple and precise way to calibrate an integrated volume acceleration sensor of a loudspeaker or volume acceleration source known.

SUMMARY OF THE INVENTION

In view of the foregoing, it is an object of the present invention to provide a system and method for volume acceleration sensor measurement that is achieved in an easy and yet precise way.

This and other objects and advantages are achieved in accordance with the present invention by a method for calibrating an integrated volume acceleration sensor of a loudspeaker comprising driving the loudspeaker with a calibration signal, generating a sensor output signal by the integrated volume acceleration sensor measuring a volume acceleration over time of a motion element (e.g., a membrane, diaphragm or cone) fixed to a moving part (flexible suspension/spider constraining a voice coil to move axially through a cylindrical magnetic gap) of the loudspeaker and/or of the moving part while the loudspeaker is driven with the calibration signal, generating a reference output signal by a reference sensor measuring the volume acceleration over time of the motion element and/or of the moving part of the loud speaker while the loudspeaker is driven with the calibration signal, and calculating a calibration value for the integrated volume acceleration sensor based on a ratio of the sensor output signal and the reference output signal and based on a predetermined reference calibration value of the reference sensor.

It is also an object of the present invention to provide a system for calibrating an integrated volume acceleration sensor of a loudspeaker which comprises a driving unit, a reference sensor and a controller. The driving unit is arranged and configured to drive the loudspeaker with a calibration signal. The reference sensor is arranged and configured to generate a reference output signal measuring the volume acceleration over time of a motion element (e.g., a membrane, diaphragm or cone) fixed to a moving part (flexible suspension/spider constraining a voice coil to move axially through a cylindrical magnetic gap) of the loudspeaker and/or of the moving part while the loudspeaker is driven with the calibration signal. The controller is communicatively connected to the reference sensor and communicatively connectable to the integrated volume acceleration sensor. The controller is arranged and configured to receive the reference output signal and a sensor output signal generated by the integrated volume acceleration sensor measuring a volume acceleration over time of the motion element and/or of the moving part of the loudspeaker while the loudspeaker is driven with the calibration signal. The controller is further arranged and configured to calculate a calibration value for the integrated volume acceleration sensor based on a ratio of sensor output signal and the reference output signal and based on a predetermined reference calibration value of the reference sensor.

The steps of driving the loudspeaker, generating the sensor output signal, and generating the reference output signal are executed at least partially in parallel. The step of calculating the calibration value may be executed after or at least partially in parallel to the aforementioned steps.

The controller may be any data processing equipment. The data processing equipment can be a Microcontroller (µC), an integrated circuit, an Application-Specific Integrated Circuit (ASIC), an Application-Specific Standard Product (ASSP), a Digital Signal Processor (DSP) or a Field Programmable Gate Array (FPGA).

The driving unit may be any driving signal source, such as a signal generator. The driving unit may be controlled by another data processing equipment or by the controller.

The loudspeaker having the integrated sensor, which has to be calibrated, can be connected to the system for calibrating the integrated volume acceleration sensor. The loudspeaker is driven with the calibration signal. The calibration signal can be a signal of a predefined length with a predefined amplitude and a predefined frequency or frequency spectrum. The calibration signal can also be a continuous sinusoidal signal of one frequency with fixed amplitude or changing (e.g., rising/falling) amplitude or a signal of many sinusoidal frequencies with fixed amplitude or changing (e.g., rising/falling) amplitude. In addition, a sequence of consecutive impulses or of consecutive sinusoidal signals with different frequencies and fixed amplitude or changing (e.g. rising/falling) amplitude can be used as the calibration signal. The calibration signal drives the loudspeaker to effect movement of the moving part of the loudspeaker. The moving part can be a combination of an annular magnet having a respective magnetic gap and a voice coil that is attracted to or repelled from the magnet based on the applied (calibration) signal. The voice coil can be suspended by a flexible spider that guides the coil perpendicularly to the magnet and exerts a pretension on the voice coil returning the latter into a position of rest when no (calibration) signal is applied. The movement of the moving part is transmitted to the motion element that may be fixedly connected to the moving part. The motion element may be a membrane, a diaphragm or a cone.

The integrated volume acceleration sensor can be any type of sensor (accelerometer) capable of measuring the acceleration of an object. The integrated volume acceleration sensor can measure the acceleration of the respective object (motion element and/or moving part) either in contact or contactless to the object. Here, the integrated volume acceleration sensor may be fixedly connected to the moving part and/or the motion element. When the loudspeaker is driven with a (calibration) signal, the integrated volume acceleration sensor generates the sensor output signal corresponding to the measured movement of the motion element and/or the moving part induced by the (calibration) signal. Consequently, while the loudspeaker is driven with the calibration signal, the integrated volume acceleration sensor outputs the corresponding sensor output signal. The sensor output signal resembles the movement of the motion element and/or the moving part induced by the calibration signal. Consequently, the volume acceleration of the motion element is determined by the integrated volume acceleration sensor, which volume acceleration is resembled by the sensor output signal.

The reference sensor can be any type of sensor (accelerometer) capable of measuring the acceleration of an object. The integrated volume acceleration sensor can measure the acceleration of the respective object (motion element and/or moving part) either in contact or contactless to the object. Here, the integrated volume acceleration sensor may contactlessly measure the movement of the motion element and/or the moving part of the loudspeaker from a distance. When the loudspeaker is driven with a (calibration) signal, the reference sensor generates the reference output signal corresponding to the measured movement of the motion element and/or the moving part induced by the (calibration) signal. Consequently, while the loudspeaker is driven with the calibration signal the reference sensor outputs the corresponding reference output signal. The sensor reference signal resembles the movement of the motion element and/or the moving part induced by the calibration signal. Consequently, the volume acceleration of the motion element is determined by the reference sensor, which volume acceleration is resembled by the reference output signal.

Based on the sensor output signal generated by the integrated volume acceleration sensor, which has to be calibrated, and on the reference output signal generated by the reference sensor the calibration value for the integrated volume acceleration sensor is determined. For that purpose, the predetermined reference calibration value of the reference sensor is combined with the reference output signal and the sensor signal is put in relation thereto.

Directly determining the volume acceleration of the motion element (membrane/diaphragm/cone) of a loudspeaker whose integrated volume acceleration sensor has to be calibrated via a reference sensor (accelerometer) provides for a very precise calibration of the integrated volume acceleration sensor without the need for a special acoustic environment or a lot of additional (acoustic) sensors and equipment. Thus, the calibration can be conducted very fast in a transparent way, because the volume acceleration is directly determined by measuring the axial displacement of the motion element with the reference sensor (and taking into account a surface area of the motion element).

In accordance with an embodiment of the present invention, the calibration signal is a broadband noise signal, preferably a broadband noise signal within a frequency band of 1 Hz [Hertz] to 10 kHz [Kilohertz] and most preferably a broadband noise signal within a frequency band of 10 Hz to 1.5 kHz.

The broadband noise signal may be a white noise signal in a predetermined frequency range. A broadband (white) noise signal within the frequency band of 10 Hz to 1.5 kHz especially provides for a well-defined calibration signal whose input power can easily be determined and that drives the loudspeaker equally over a broad frequency range. This leads to an equal movement of the motion element and the moving part at a sufficient amplitude of the movement. This equal movement of sufficient amplitude can be detected particularly precisely by the reference sensor as well as the integrated volume acceleration sensor and, thus, the resulting calibration value for the integrated volume acceleration sensor is of particularly high accuracy. Consequently, the broadband (white) noise signal provides for a particularly precise calibration of the integrated volume acceleration sensor.

In accordance with an embodiment of the present invention, the reference sensor is a laser sensor. A laser sensor measures the distance of an object to the laser sensor. By measuring the distance over time, it is also possible to determine the velocity and acceleration of the object. The laser sensor can be directed towards the motion element and/or the moving part of the loudspeaker. Preferably, the laser sensor can be directed to the motion element and/or moving part at the outside of the laser sensor. Moreover, the laser sensor can be directed towards the motion element and/or moving part in a direction in parallel to a direction of movement of the motion element and/or moving part. The laser sensor emits laser pulses of a predefined duration or length in a predefined interval. The emitted laser pulses are reflected at the motion element and/or moving part. The reflected laser pulses are detected at a respective detector of the laser sensor and evaluated. Based on the evaluation, the distance between the laser sensor and the motion element and/or the moving part is determined and the respective acceleration of the motion element and/or the moving part is derived.

The laser sensor can be easily arranged and positioned relative to the loudspeaker for measuring the volume acceleration and yet, a very accurate reference output signal can be generated.

In accordance with another embodiment of the present invention, the measuring of the volume acceleration by the reference sensor or rather the laser sensor is based on measuring the displacement of the motion element by using triangulation, laser interferometry or laser time-of-flight measurement.

In accordance with another embodiment of the present invention the laser sensor is arranged and configured to measure the volume acceleration based on measuring the displacement of the motion element by using triangulation, laser interferometry or laser time-of-flight measurement.

Triangulation is a process of determining a location of a point by forming triangles to it from known points. Triangulation involves only angle measurements, rather than measuring distances to the point directly. The reference sensor for triangulation comprises at least two (laser-)sensors observing the motion element and/or moving part of the loudspeaker. Projection centres of the sensors (e.g., emission direction of the respective laser beam or pulses) and a considered point on the surface area of the motion element/moving part define a (spatial) triangle. Within this triangle, the predefined distance between the sensors is called base (b) and is known. By determining angles between the projection rays (laser beams/pulses) of the sensors and the basis (b), the intersection point, and thus a coordinate in 3D space, is calculated from the triangular relations and the displacement of the motion element/moving part of the loudspeaker can be determined. It is also possible to use both, angles and distance measurements, in a combination of triangulation and trilateration (determination of the location of a point based on its distance from three other points) that is referred to as triangulateration.

With laser interferometry, the electromagnetic waves of a laser are superimposed causing interference. Thereto, a single laser beam of coherent light will be split into two identical laser beams by a beam splitter (e.g., a partially reflecting mirror). Each of these laser beams travels a different route, and they are recombined before arriving at a detector. The path difference, the difference in the distance travelled by each laser beam, creates a phase difference between them. It is this introduced phase difference that creates the interference pattern between the initially identical waves. If a single laser beam has been split along two paths, then the phase difference is diagnostic of anything that changes the phase along the paths. Here, one of the laser beams is directed towards a reference reflection surface and the other laser beam is directed towards the motion element and/or the moving part of the loudspeaker. Based on the interference introduced by the changing distance of the motion element and/or moving part with respect to the reference reflection surface, the respective displacement of the motion element and/or moving part over time can be determined and the corresponding acceleration derived.

With the laser time-of-flight measurement, the position or displacement of the motion element and/or the moving part is determined based on a time-of-flight of a laser pulse in during which the laser pulse propagates form the reference sensor (i.e., laser sensor) to the motion element and/or the moving part, where it is reflected, and back to the reference sensor, where the laser pulse is detected. Based on the determined time-of-flight and the speed of light, the respective distance to the motion element and/or the moving part are calculated. Based on the calculated distances over time, the acceleration (and velocity) of the motion element and/or the moving part is derived.

The triangulation or laser interferometry or laser time-of-flight measurement provide for very accurate determination of the displacement of the motion element and/or the moving part of the loudspeaker. Consequently, a very precise reference output signal can be generated.

In accordance with another embodiment of the present invention, the reference output signal is a reference output voltage over time and the sensor output signal is a sensor output voltage over time.

In accordance with another embodiment of the present invention, the reference sensor is arranged and configured to generate a reference output voltage over time as the reference output signal and the controller is arranged and configured to receive, as the reference output signal, the reference output voltage over time and, as that sensor output signal a sensor output voltage over time.

The calibration value for the integrated volume acceleration sensor $C_{sensor}$ [V/(m³/s)] ([Volt per cubic Metre per Second]), which is a relationship between the measured volume acceleration and the sensor output voltage of the volume acceleration sensor, can be calculated based on a relationship between the sensor output voltage $V_{sensor}$ [V] over time and the reference output voltage $V_{reference}$ [V] over time generated while the calibration signal was applied to the loudspeaker and based on the calibration value for the reference sensor $C_{reference}$ [V/(m³/s)] which is based on an velocity calibration value of the reference sensor $C_{v,reference}$ [V/(m/s)] ([Volt per Metre per Second]) and an surface area of the motion element (e.g., membrane/diaphragm/cone) of the loudspeaker $S_{cone}$ [m²] ([square Metre]) in accordance with the following relationship:

$$C_{sensor} = V_{sensor} / V_{reference} * C_{reference} =$$ Eq. 1
$$= V_{sensor} / V_{reference} * C_{v,reference} / S_{cone}$$

Comparing the reference output signal in the form of a voltage over time and the sensor output signal in form of a voltage over time enables a very simple and yet precise comparison of the two output signals.

In accordance with an embodiment of the present invention, the method further comprises the step of deriving a reference spectral response from the reference output signal and a sensor spectral response from the sensor output signal. The step of calculating the calibration value for the integrated volume acceleration sensor is based on a ratio of the reference spectral response and the sensor spectral response and based on the predetermined reference calibration value of the reference sensor.

In accordance with another embodiment of the present invention, the controller is arranged and configured to derive a reference spectral response from the reference output signal and a sensor spectral response from the sensor output signal. The controller is further arranged and configured to calculate the calibration value for the integrated volume acceleration sensor based on a ratio of the reference spectral response and the sensor spectral response and based on the predetermined reference calibration value of the reference sensor.

The reference output signal and the sensor output signal are converted into the frequency domain. The conversion can be accomplished via a Fast Fourier Transformation (FFT) for each of the signals. The resulting reference spectral response and sensor spectral response are used for calculating the calibration value for the integrated volume acceleration sensor. These spectral signals allow for determining a ratio between signals without out-of-band noise that is present in time domain signals. These complex Frequency Response Functions (FRFs) are calculated through the processed crosspower and autopower spectra.

Therefore, the calibration value for the integrated volume acceleration sensor can be determined more precisely by diminishing the influence of out-of-band noise.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention and its technical field are subsequently explained in further detail by an exemplary embodiment shown in the drawing. The exemplary embodiment only conduces better understanding of the present invention and in no case is to be construed as limiting for the scope of the present invention. Particularly, it is possible to extract aspects of the subject-matter described in the figure and to combine it with other components and findings of the present description or figure, if not explicitly described differently. Equal reference signs refer to the same objects, such that explanations from other figures may be supplementally used, in which.

DETAILED DESCRIPTION OF THE EXEMPLARY EMBODIMENTS

Figure 1:
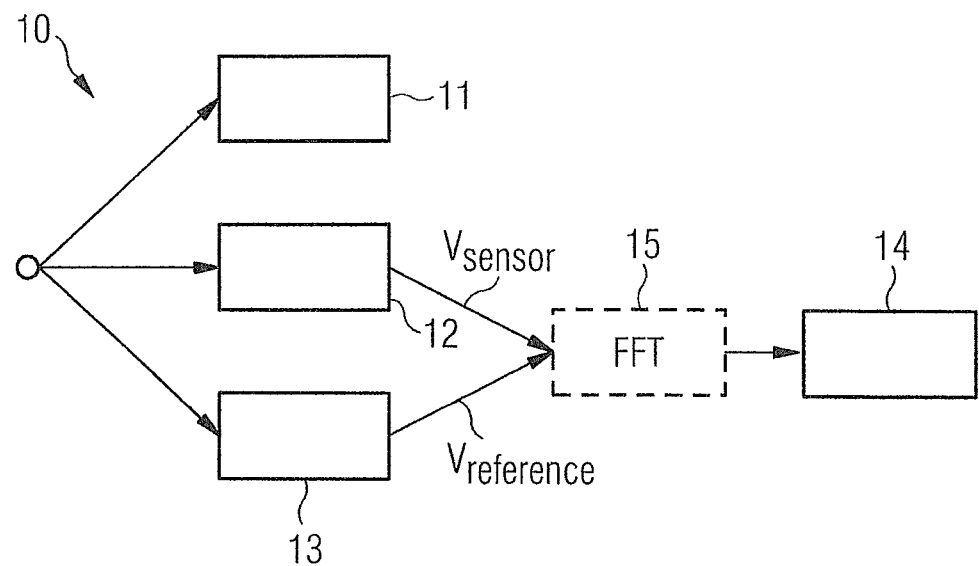
FIG. 1 is a schematic flowchart of the method in accordance with the present invention.

A flow chart of a method 10 of calibrating an integrated volume acceleration sensor of a loudspeaker is schematically depicted in FIG. 1.

In a step of driving 11 the loudspeaker, a broadband noise signal in the range of 10 Hz to 1.5 kHz is provided to the loudspeaker as a calibration signal in order to drive a moving part of the loudspeaker having a voice coil constrained by a spider moving axially through a cylindrical magnetic gap of an annular magnet. The moving part is connected to a cone (motion element) that emits sound in accordance with the provided broad band noise signal.

In a step of generating 12 a sensor output signal, the integrated volume acceleration sensor generates a sensor output voltage $V_{sensor}$ [V] over time as sensor output signal according to a displacement of the cone that is driven by the moving part according to the broadband noise signal (calibration signal).

In a step of generating 13 a reference output signal a reference sensor, which is a laser-sensor using triangulation, generates a reference output voltage $V_{reference}$ [V] over time as sensor output signal according to the displacement of the cone that is driven by the moving part according to the broadband noise signal (calibration signal).

In a step of calculating 14 a calibration value $C_{sensor}$ [V/(m³/s)] for the integrated volume acceleration sensor, the calibration value $C_{sensor}$ for the integrated volume acceleration sensor is calculated in accordance with the relationship:

$$C_{sensor} = V_{sensor} / V_{reference} * C_{reference} = \\ = V_{sensor} / V_{reference} * C_{v,reference} / S_{cone}$$ Eq. 1 where $C_{reference}$ is a reference calibration value of the laser sensor [V/(m³/s)], $C_{v,reference}$ [V/(m/s)] is a velocity calibration value of the reference sensor and $S_{cone}$ is a surface area of the cone [m²].

Optionally, in an optional step of deriving 15 a reference spectral response from the reference output signal and a sensor spectral response from the sensor output signal, the reference output voltage $V_{reference}$ over time and the sensor output voltage $V_{sensor}$ over time are transformed (from the time domain) into the frequency domain via a Fast Fourier Transformation (FFT) such that the reference spectral response is derived from the reference output voltage $V_{reference}$ over time and sensor spectral response is derived from the sensor output voltage $V_{sensor}$ over time. In the subsequent step of calculating 14, the calibration value $C_{sensor}$ for the integrated volume acceleration sensor is calculated based on the reference spectral response and the sensor spectral response as well as on the predetermined reference calibration value $C_{reference}$ of the reference sensor.

Figure 2:
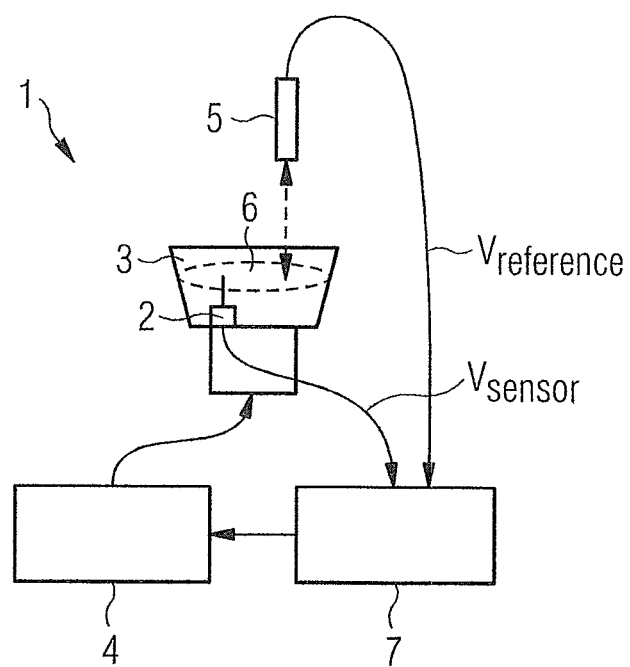
FIG. 2 is a schematic view of the system in accordance with the present invention.

A view of a system 1 for calibrating an integrated volume acceleration sensor 2 of a loudspeaker 3 is schematically depicted in FIG. 2. The loudspeaker 3 is a volume acceleration source having an integrated volume acceleration sensor 2 and is electrically connected to a signal generator 4 arranged and configured to drive the volume acceleration source 3. The signal generator 4 may be arranged and configured to generate a signal of multiple frequencies in a range from 1 Hz to 10 kHz and a output power (or input power to the loudspeaker/volume acceleration source 3) of 100 mW [Milliwatt] to 100 W [Watt]. A laser sensor 5 is directed towards a cone 6 of the volume acceleration source 3. Here, the laser sensor 5 comprises two laser sensors at a predefined distance, called base b, from each other that are directed towards one predefined point on a surface area of the cone 6. Each of the at least two laser sensors of the laser sensor 5 may have a sensing range of ±10 mm [Millimetre] and a precision of 1 μm [Micrometre]. The integrated volume acceleration sensor 2 and the laser sensor 5 are electronically connected to a controller 7, which is a personal computer having a storage for storing data, a microprocessor (μC) for processing data and an input and output interface (I/O) for interaction with a user. The controller 7 is electronically connected to the signal generator 4.

The volume acceleration source 3 is driven by the signal generator 4 as driving unit. For the calibration of the integrated volume acceleration sensor 2, the volume acceleration source 3 is driven by the signal generator 4 with a broadband noise signal in the range of 10 Hz to 1.5 kHz as the calibration signal. The controller 7 may control the signal generation of the signal generator 4. The laser sensor 5, which is using triangulation, measures the displacement of the cone 6 of the volume acceleration source 3, which is a motion element that is driven by a moving part of the volume acceleration source 3 having a voice coil suspended by a spider and moving through a cylindrical magnetic gap of an annular magnet. The cone 6 is displaced by the motion part according to the broad band noise signal provided to the volume acceleration source 3 by the signal generator 4. Additionally, the integrated volume acceleration sensor 2, which is to be calibrated, measures the displacement of the cone 6 while the volume acceleration source 3 is driven with the broadband noise signal by the signal generator 4.

While measuring the displacement of the cone 6 driven by the broadband noise signal, the laser sensor 5 generates a corresponding reference output voltage $V_{reference}$ [V] over time as reference output signal and the integrated volume acceleration sensor 2 generates a corresponding sensor output voltage $V_{sensor}$ [V] over time as sensor output signal. The reference output voltage $V_{reference}$ and the sensor output voltage $V_{sensor}$ are transmitted to the controller 7. The controller 7 calculates, from a ratio of the reference output voltage $V_{reference}$ over time and the sensor output voltage $V_{sensor}$ over time together with a predefined reference calibration value $C_{reference}$ of the laser sensor 5, the calibration value $C_{sensor}$ for the integrated volume acceleration sensor 2. Optionally, the controller 7 can transform the reference output voltage $V_{reference}$ over time to a reference spectral response and the sensor output voltage $V_{sensor}$ over time to a sensor spectral response in the frequency domain via a FFT. Based on the reference spectral response and the sensor spectral response as well as the predefined reference calibration value $C_{reference}$ of the laser sensor 5, the calibration value $C_{sensor}$ for the integrated volume acceleration sensor 2 can be calculated by the controller 7.

Instead of one single reference sensor 5, a multitude of reference sensors (e.g., different laser sensors) may be used to measure the displacement of the motion element 6 (cone) and/or the moving part (voice coil with spider and annular magnet).

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., if provided, are used merely as labels, and are not intended to impose numerical requirements on or to establish a certain ranking of importance of their objects. In the context of the present description and claims the conjunction "or" is to be understood as including ("and/or") and not exclusive ("either . . . or").

What is claimed is:

1. A method for calibrating an integrated volume acceleration sensor of a loudspeaker, the method comprising:
    driving the loudspeaker with a calibration signal;
    generating a sensor output signal by the integrated volume acceleration sensor measuring a volume acceleration over time of a motion element fixed to a moving part of at least one of (i) the loudspeaker and (ii) the moving part while the loudspeaker is driven with the calibration signal;
    generating a reference output signal by a reference sensor measuring the volume acceleration over time of at least one of (i) the motion element and (ii) the moving part of the loudspeaker while the loudspeaker is driven with the calibration signal; and
    calculating a calibration value for the integrated volume acceleration sensor based on a ratio of the sensor output signal and the reference output signal and based on a predetermined reference calibration value of the reference sensor.

2. The method according to claim 1, wherein the calibration signal is a broadband noise signal.

3. The method according to claim 1, wherein the broadband noise signal is within a frequency band of 1 Hz (Hertz) to 10 kHz (Kilohertz).

4. The method according to claim 3, wherein the broadband noise signal is within a frequency band of 10 Hz to 1.5 kHz.

5. The method according to claim 1, wherein the measuring of the volume acceleration by the reference sensor is based on measuring a displacement of the motion element by utilizing one of (i) triangulation, (ii) laser interferometry and (iii) laser time-of-flight measurement.

6. The method according to claim 1, wherein the reference output signal is a reference output voltage over time and the sensor output signal is a sensor output voltage over time.

7. The method according to claim 1, further comprising:
    deriving a reference spectral response from the reference output signal and a sensor spectral response from the sensor output signal;

wherein said step of calculating the calibration value for the integrated volume acceleration sensor is based on a ratio of the reference spectral response and the sensor spectral response and based on the predetermined reference calibration value of the reference sensor.

8. A system for calibrating an integrated volume acceleration sensor of a loudspeaker, comprising:
a driving unit arranged and to drive the loudspeaker with a calibration signal;
a reference sensor arranged and configured to generate a reference output signal measuring the volume acceleration over time of a motion element fixed to a moving part of at least one of (i) the loudspeaker and (ii) the moving part while the loudspeaker is driven with the calibration signal; and
a controller communicatively connected to the reference sensor and communicatively connectable to the integrated volume acceleration sensor, said controller being arranged and configured to receive the reference output signal and a sensor output signal generated by the integrated volume acceleration sensor measuring a volume acceleration over time of at least one of (i) the motion element and (ii) the moving part of the loudspeaker while the loudspeaker is driven with the calibration signal and being further configured to calculate a calibration value ($C_{sensor}$) for the integrated volume acceleration sensor based on a ratio of sensor output signal and the reference output signal and based on a predetermined reference calibration value of the reference sensor.

9. The system according to claim 8, wherein the calibration signal is a broadband noise signal, preferably a broadband noise signal.

10. The system according to claim 8, wherein the calibration signal is a broadband noise signal within a frequency band of 1 Hz (Hertz) to 10 kHz (Kilohertz).

11. The system according to claim 10, wherein the broadband noise signal is within a frequency band of 10 Hz to 1.5 kHz.

12. The system according to claim 8, wherein the reference sensor is a laser sensor.

13. The system according to claim 9, wherein the reference sensor is a laser sensor.

14. The system according to claim 12, wherein the laser sensor is arranged and configured to measure the volume acceleration based on measuring a displacement of the motion element by utilizing one of (i) triangulation, (ii) laser interferometry and (iii) laser time-of-flight measurement.

15. The system according to claim 8, wherein the reference sensor is arranged and configured to generate a reference output voltage over time as the reference output signal; and
wherein the controller is arranged and further configured to receive as a reference output signal the reference output voltage over time and as a sensor output signal a sensor output voltage over time.

16. The system according to claim 8, wherein the controller is arranged and further configured to derive a reference spectral response from the reference output signal and a sensor spectral response from the sensor output signal and further configured to calculate the calibration value for the integrated volume acceleration sensor based on a ratio of the reference spectral response and the sensor spectral response and based on the predetermined reference calibration value of the reference sensor.

* * * * *